United States Patent [19]
Kraft

[11] Patent Number: 6,049,420
[45] Date of Patent: Apr. 11, 2000

[54] COAXIAL DRIVE FOR THE OBJECT STAGE OF A MICROSCOPE

[75] Inventor: Winfried Kraft, Asslar-Werdorf, Germany

[73] Assignee: Carl Zeiss Jena GmbH, Jena, Germany

[21] Appl. No.: 09/130,621

[22] Filed: Aug. 7, 1998

[30] Foreign Application Priority Data

Aug. 16, 1997 [DE] Germany ............... 197 35 492

[51] Int. Cl.⁷ .................................................. G02B 21/26
[52] U.S. Cl. ......................................... 359/393; 359/391
[58] Field of Search .................... 359/368, 391–395; 74/102, 490.13; 318/603, 640

[56] References Cited

U.S. PATENT DOCUMENTS

| | | | |
|---|---|---|---|
| 4,097,116 | 6/1978 | Kuroha | 359/393 |
| 4,189,953 | 2/1980 | Volk | 359/393 |
| 4,402,576 | 9/1983 | Stahl et al. | 359/393 |
| 4,615,592 | 10/1986 | Schob et al. | 359/393 |

*Primary Examiner*—Thong Nguyen
*Attorney, Agent, or Firm*—McAulay Nissen Goldberg Kiel & Hand, LLP

[57] ABSTRACT

Coaxial drive for the object stage of a microscope, with a stationary guide supporting a first stage part which is horizontally displaceable in a first displacement direction. The first stage part supports a second stage part which is displaceable horizontally in a second displacement direction. A first control element displaces the first stage part in the first displacement direction and a second control element displaces the second stage part in the second displacement direction. The two control elements are rotatable about a coaxial axis and spatially retain their respective positions during displacement of the first stage part or second stage. A first force transmission device swivels about a second axis and displaces the second stage part. A second force transmission device acts on the second stage part. A rotating rod is provided between the first and second force transmission devices and transmit a rotation of the first to the second force transmission device. The rotating rod slides in the guide during the displacement of the second stage part, and either the guide or the rotating rod is swivelable about the second axis with the first force transmission device and is rotated by the first force transmission, and the force transmission is carried out by transmission of the rotating movement to the rotating rod or to the guide.

1 Claim, 3 Drawing Sheets

COAXIAL DRIVE FOR THE OBJECT STAGE OF A MICROSCOPE

BACKGROUND OF THE INVENTION a) Field of the Invention

The invention is directed to a coaxial drive for the object stage of a microscope.

b) Description of the Related Art

A generic arrangement of the type mentioned above is described, for example, in DE 19532008 A1 by the present Applicant.

In conventional cross-slide stages for microscopes, the two coordinate movements "X" and "Y" are actuated by the coaxial drive, as it is called. In so doing, the coaxial drive remains stationary during the X-movement. During the Y-movement, the coaxial drive moves in the Y-direction. However, this is extremely unergonomic.

It is desirable that the location of the coaxial drive remains constant so that there is a spatially fixed distance relative to the Z-fine focussing drive.

DE 3514431 A1 describes a microscope stage drive with control knobs fastened at coaxially mounted shafts, wherein the transmission of force is effected by traction means which are guided in a complicated manner and run over deflecting rollers fastened at the stage plates, wherein the slip of the traction means which cannot be completely eliminated does not enable an exactly reproducible stage position. Operation cannot be carried out with sufficient sensitivity because of the many deflections. Exact positioning, e.g., in tissue cells, in the range of a few $\mu$m, is impossible.

Other solutions with stationary adjusting devices, but with considerable structural complexity, are described in DE 3027461 C2 and DE 3521047 C1. However, DE 3027461 C2 is more concerned with the uncoupling of the X-Y coordinate movement by swiveling out the coaxial drive which is connected with the X-Y movement by means of a friction wheel.

DE-GM 1978009 is directed to an object holder representing a microscope accessory which is generally fastened to a microscope stage in order to move objects over the stage plate which is usually stationary.

DE 3521047 C1 describes separate straight-line guides for X and Y. These guides are expensive, require extensive maintenance and occupy a large amount of space. The sliding of the profile axis causes shaking and noise which could disturb the concentration of the user.

OBJECT AND SUMMARY OF THE INVENTION

The primary object of the invention is a simply constructed, stationary, space-saving coaxial drive.

This object is achieved, in accordance with the invention, by a coaxial drive for the object stage of a microscope which comprises a stationary guide supporting a first stage part which is horizontally displaceable in a first displacement direction and a second stage part which is supported by the first stage part. The second stage part is displacable horizontally in a second displacement direction and perpendicular relative to the first displacement direction. A first control element is included which acts at the first stage part for displacing the first stage part in the first displacement direction and a second control element is included for displacing the second stage part in the second displacement direction. The two control elements are rotatable about a coaxial axis and spatially retain their respective positions during displacement of the first stage part or second stage part. First force transmission means swiveable about a second axis are also provided for the displacement of the second stage part. The first force transmission means communicates with the second control element via first gear means. Second force transmission means are further provided which act on the second stage part via second gear means. A rotating rod which is supported in a positive engagement in a guide so as to be displaceable is also provided between the first and second force transmission means for transmitting a rotation of the first transmission means to the second force transmission means. The rotating rod slides in the guide during the displacement of the second stage part. One of the guide and the rotating rod is swivelable about the second axis with the first force transmission means and is rotated by the first force transmission means. The force transmission is carried out by transmission of the rotating movement to the rotating rod or to the guide.

The manner of operation and the advantages of the invention are explained more fully in the following with reference to the schematic drawings of the construction.

DESCRIPTION OF THE PREFERRED EMBODIMENTS

Figure 1:
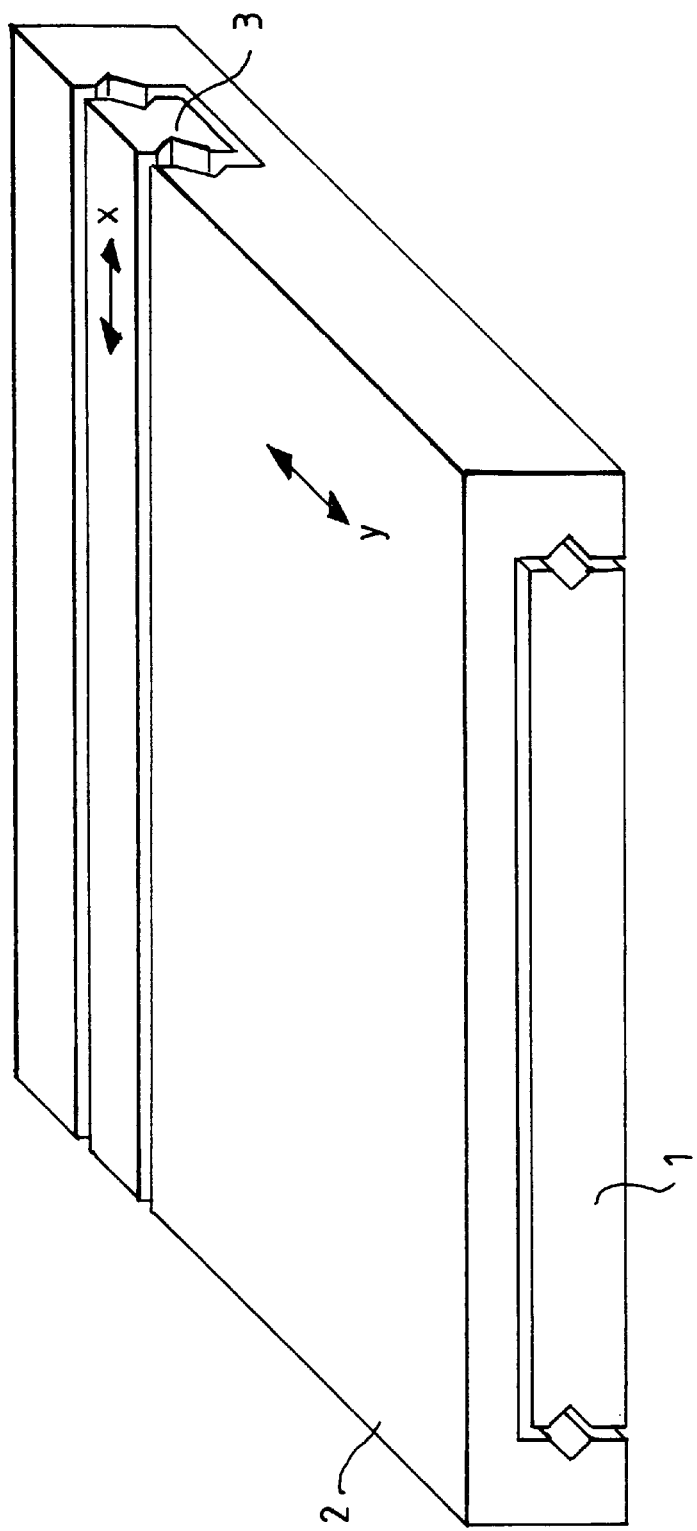
FIG. 1 shows the stage units for X- and Y-displacement which are guided one inside the other.
Figure 2:
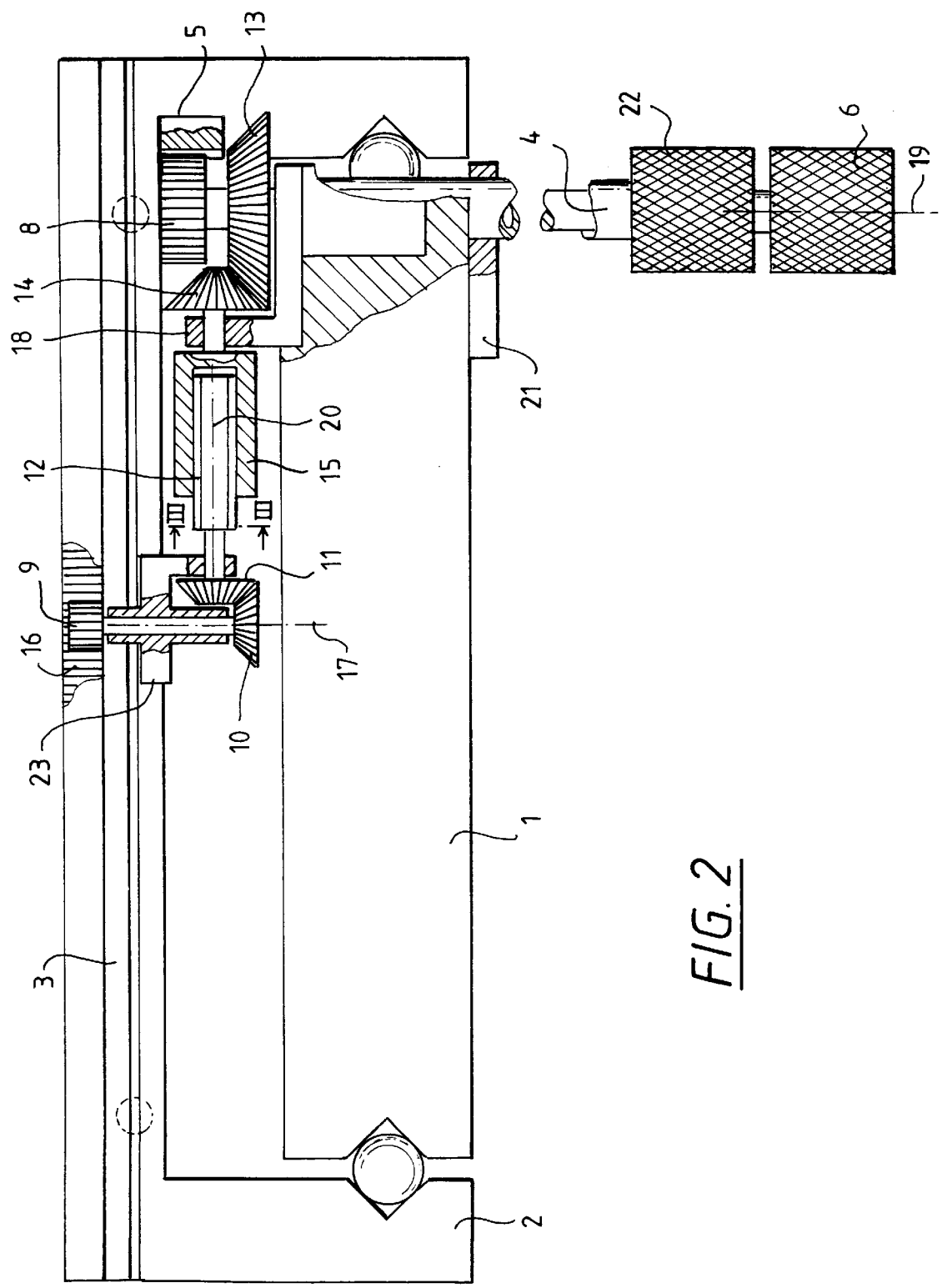
FIG. 2 shows a partial cross section through the coaxial drive according to the invention.

A stage plate (1) is fixedly screwed to the stage fork (not shown) of a microscope or is fastened thereto in some other manner.

A Y-stage plate (2) for the Y-movement is fastened to the stage plate (1) so as to be displaceable, for example, by means of sliding bearings or ball bearings.

The Y-stage plate (2) contains the carriage (3), as it is called, for the X-movement, wherein this carriage (3) is displaceable via sliding bearings or ball bearings. This carriage (3) is functionally integrated within the Y-stage plate (2) via its guide.

Further, the coaxial drive (4) is fastened to the fixed stage plate (1) in a fastening device (21) (e.g., clamps). It drives the X-carriage (3) as well as the Y-stage plate (2). In this respect, it is in a functional engagement (e.g., via a toothing) with the toothed rack (5) at the Y-stage plate (2).

By rotating the appropriate knurled knob (6), the Y-stage plate (2) is moved in the Y-direction parallel to the fixed stage plate (1) via the pinion (8) and the toothed rack (5).

At the same time, the pinion (9) is in a functional engagement with a pair of bevel wheels (10/11). The bevel wheel (11) is fixedly connected with the sliding rod (12). The sliding rod (12) is rotatably supported in the holder (23).

The drive pinion (13) at the coaxial drive (4) and the driven pinion (14) are in a functional engagement with one another. The driven pinion (14), in this case a bevel wheel, is fixedly connected with the sliding nut (15). The pin of the bevel wheel (14) and the sliding nut (15) is rotatably supported in the holder (18).

Figure 3A:
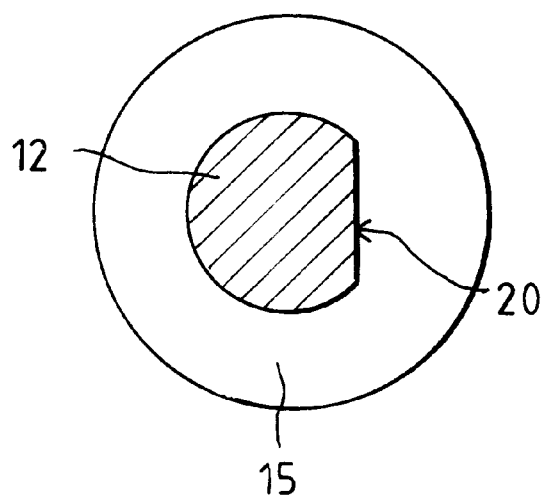
FIGS. 3a–3d show a partial cross section along line III in FIG. 2 and further possible constructions of the sliding rod 12.
Figure 3B:
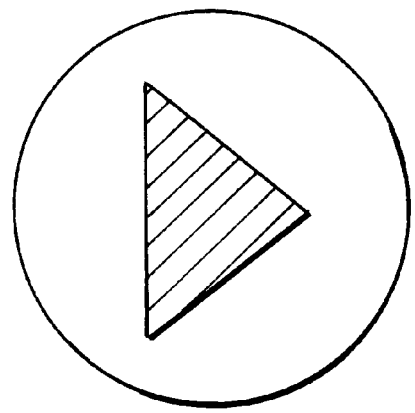
Figure 3C:
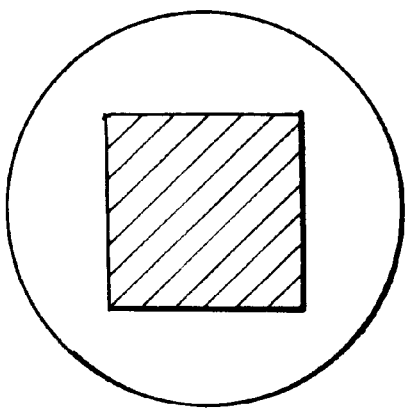
Figure 3D:
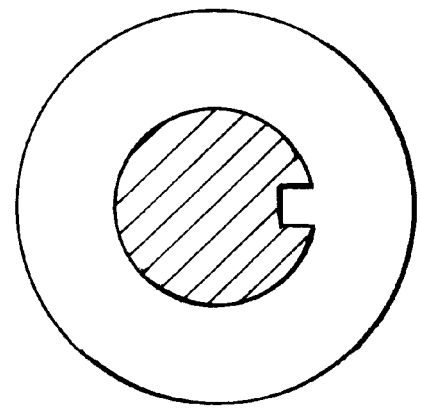

The sliding rod (12) is flattened on one side in the longitudinal direction as is shown in FIG. 3a. It is connected in a positive engagement with the sliding nut (15), but in such a way that it is displaceable. According to FIGS. 3b–3d, there are other possible shapes of the sliding rod and internal shapes of the sliding nut which ensure that the sliding rod is driven by a positive engagement.

The sliding rod (12) can accordingly slide in the sliding nut (15) in the axial direction (20). At its opposite end, the sliding rod (12) has a drive pinion (11), in this case a bevel wheel, which is connected with it so as to be fixed with respect to rotation relative to it. The drive pinion (11) is in a functional engagement with the driven pinion (10), in this case a bevel wheel. The bevel wheel (10) is connected with the pinion (9) so as to be fixed with respect to rotation relative to it. The pinion (9) is, in turn, in a functional engagement with the toothed rack (16) fastened to the X-carriage. The preferably vertically arranged axis of rotation (17) of the driven pinion (9) for the X-carriage (3) is mounted together with the pair of bevel wheels (13, 14) at the Y-carriage so as to be rotatable about the axis of rotation of the driven pinion (13), so that the functional engagement with respect to the X-carriage (3) is always guaranteed in an optimum manner.

At the same time, holder (18), bevel wheel (14) with sliding nut (15), sliding rod (12) with bevel wheel (11), bevel wheel (10) with driving pinion (9) and holder (23) are supported in their entirety around the vertical axis of rotation (17) of the driven pinion (9) for the X-carriage (3) in such a way that they can follow the movement of the Y-stage plate (12) during its Y-movement without influencing or interrupting the positive and frictional connections.

The sliding rod (12) moves only corresponding to the travel or stroke caused by the Y-stage plate back and forth in the sliding nut (15). The sliding guide and engagements of the pinions are configured by mechanical means in such a way that there is no so-called nonreversing ("play").

In this way, a cross-slide stage for microscopes is realized, wherein this cross-slide stage substantially comprises a stationary coaxial drive (4), a fixed stage plate (1) fastened to the stage holder of the microscope (not shown), a Y-stage plate (2) which is supported at or on stage plate (1) so as to be displaceable, and an X-carriage (3) which is supported so as to be displaceable in the Y-stage plate.

The coaxial drive (4) is fastened (e.g., clamped) at or in a fastening arrangement (21) at the stage plate (1).

The coaxial drive (4) comprises two coaxial drive elements, preferably pinions, bevel wheels, friction wheels or other devices having a similar function, which operate independently from one another.

The drive element (e.g., pinion/bevel wheel, friction wheel) (8) for the Y-movement is in a functional engagement with a driven element (toothed rack) (5) which is fixedly connected with the stage plate (2). When the knurled knob (6) is rotated, the drive element (8) rotates and displaces the stage plate (2) in the Y-direction. The drive element (e.g., pinion/bevel wheel, friction wheel) (13) which accounts for the X-movement by means of the knob (22) is in a functional engagement with the driven element (e.g., pinion/bevel wheel, friction wheel) (14) which is mounted as a functional unit so as to be rotatable about the axis of rotation (19) of the drive element (13). The driven element (e.g., bevel wheel) (14) is connected with the sliding nut (15) so as to be fixed with respect to rotation relative to it and is rotatably mounted in the holder (18).

The sliding rod (12) which is connected with the sliding nut (15) in a positive engagement, but so as to be displaceable, can be displaced only in the direction of the axis (20).

On its opposite side, the sliding rod (12) has a drive element (e.g., pinion, bevel wheel) (11) which is in a functional engagement with another driven element (e.g., pinion, bevel wheel) (10). Bevel wheel (11) and bevel wheel (10) are mounted so as to be rotatable in the holder (23). Bevel wheel (10) and pinion (9) are connected with one another so as to be fixed with respect to rotation relative to one another and are mounted so as to be rotatable, as a functional unit, in the holder (23). The pinion (9) is in a functional engagement with a corresponding function element (e.g., toothed rack) (16) at the X-carriage (3).

Pinion (14) with sliding nut (15), sliding rod (12) with drive element (e.g., pinion) (11), driven element (10) with drive element (9) at the X-carriage (3), and holder (23) are mounted via the holder (18) so as to be rotatable about the axis of rotation (19) of the coaxial drive (4).

When the knurled knob (22) is rotated at the coaxial drive (4), the drive element (13) which is connected therewith so as to be fixed with respect to rotation relative to it and the driven element (14) rotate together with the sliding nut (15). Therefore, the sliding rod (12) which is connected in a positive engagement and is only displaceable in the axial direction (20) also rotates in a compulsory manner. The sliding rod (12) rotates the drive pinion (11), which is fixedly connected therewith, together with the driven element (10). This driven element (10) is in a functional engagement with the drive pinion (9) of the X-carriage (3). The holder (23) is mounted so as to be rotatable about the axis (17).

When the Y-carriage is moved, only the slide rod (12) is displaced in the sliding nut (15) to the extent of the difference in spacing between the two axes of rotation (17) and (19).

The invention is not limited to the embodiment form shown herein. In particular, the sliding rod 12 and sliding nut 15 can be exchanged, so that the rotating movement is carried out by a sliding rod connected with the driven pinion 14 to a sliding nut (not shown) connected with the drive pinion 11, wherein the sliding rod slides in the sliding nut during displacement of the X-carriage (2).

While the foregoing description and drawings represent the preferred embodiments of the present invention, it will be obvious to those skilled in the art that various changes and modifications may be made therein without departing from the true spirit and scope of the present invention.

What is claimed is:

1. A coaxial drive for the object stage of a microscope, comprising:

a stationary guide supporting a first stage part which is horizontally displaceable in a first displacement direction;

a second stage part being supported by the first stage part;

said second stage part being displaceable horizontally in a second displacement direction and perpendicular relative to the first displacement direction;

a first control element acting at the first stage part for displacing the first stage part in the first displacement direction and a second control element for displacing the second stage part in the second displacement direction;

said two control elements being rotatable about a coaxial axis and which spatially retain their positions during displacement of the first stage part or second stage part;

first force transmission means swivelable about a second axis being provided for the displacement of the second stage part;

said first force transmission means communicating with the second control element via first gear means;

second force transmission means being provided which act on the second stage part via second gear means;

a rotating rod which is supported in a positive engagement in a guide so as to be displaceable being provided between the first and second force transmission means for transmitting a rotation of the first force transmission means to the second force transmission means;

said rotating rod slides in the guide during the displacement of the second stage part; and one of the guide and the rotating rod being swivelable about the second axis with the first force transmission means and being rotated by the first force transmission means, and the force transmission being carried out by transmission of the rotating movement to the rotating rod or to the guide.

* * * * *